United States Patent Office 3,490,328
Patented Jan. 20, 1970

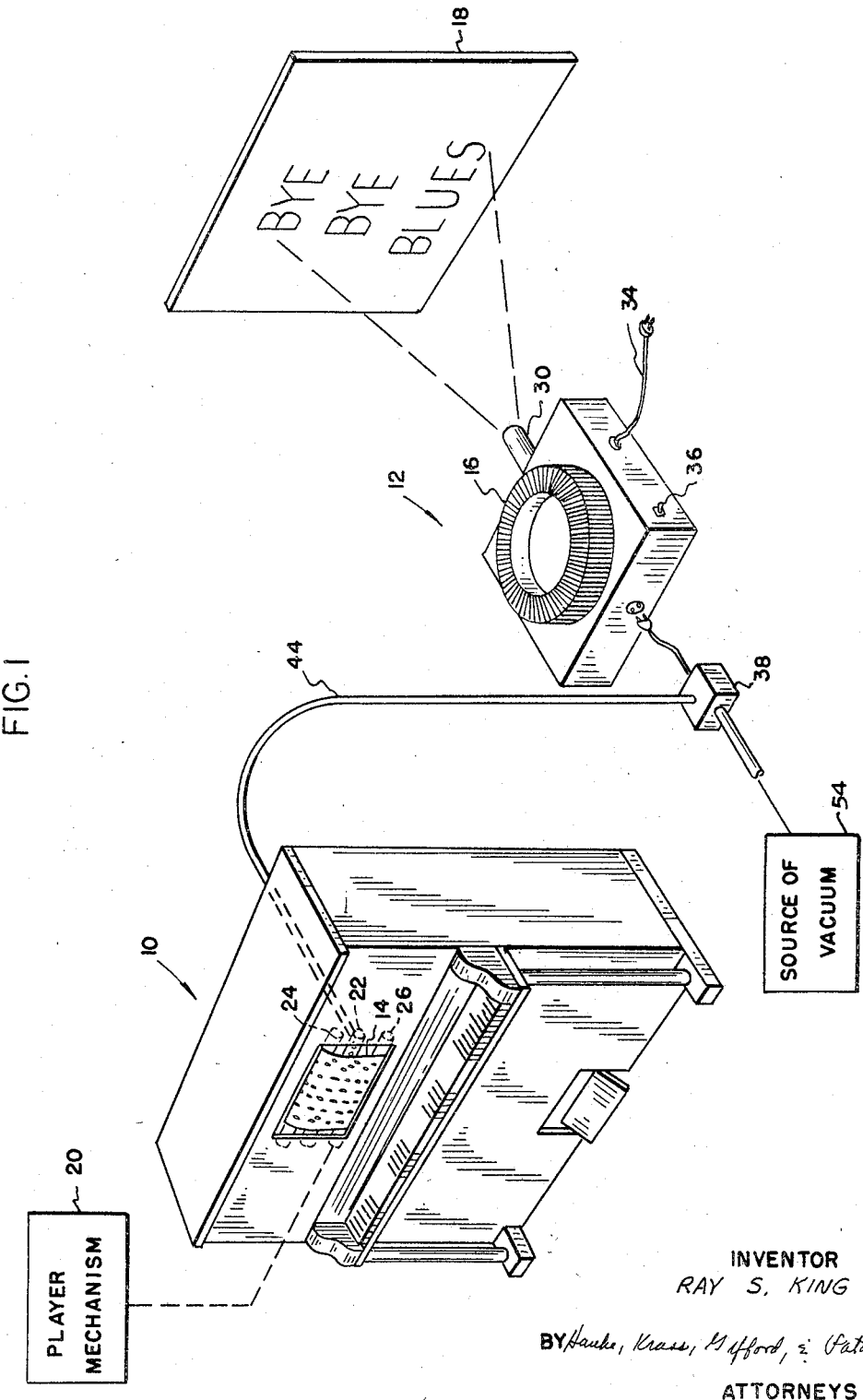

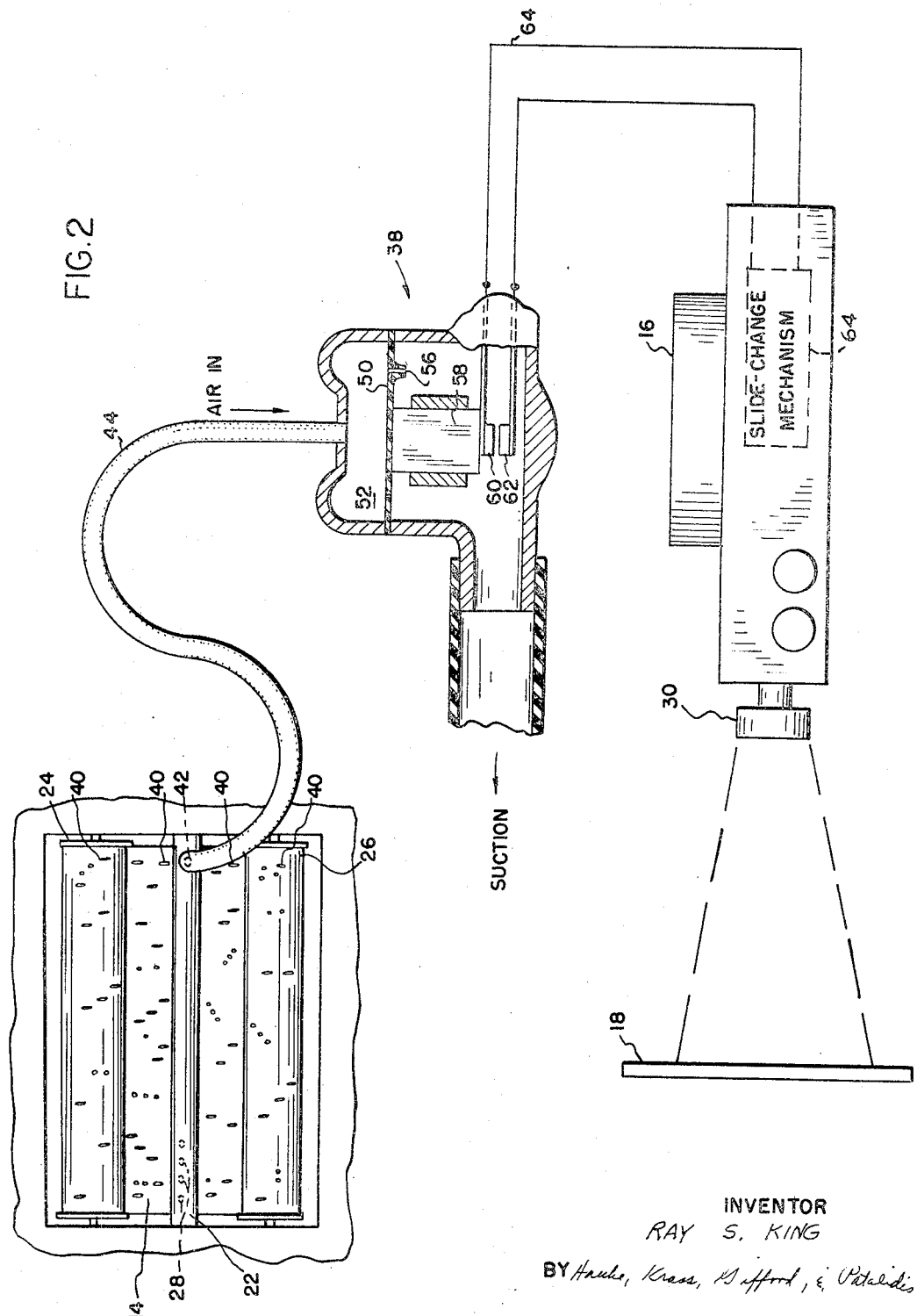

3,490,328
PLAYER PIANO WITH SLIDE DEVICE
Ray S. King, 607 Ashburnham Road,
Pontiac, Mich. 48057
Filed May 8, 1968, Ser. No. 727,555
Int. Cl. G10f 5/00; A63j 17/00
U.S. Cl. 84—169
7 Claims

ABSTRACT OF THE DISCLOSURE

A player piano having a pneumatic-electrical connection to the slide changer mechanism of a slide projector that senses a series of control perforations in the piano roll to initiate a slide-change operation so that a set of slides with the words of a song may be projected on a screen in synchronization with the playing of the melody on the piano roll.

Background of the invention

This invention relates to automatic musical instruments controlled by the operation of a player mechanism and more specifically to a player piano or organ adapted to play a selected melody in accordance with the perforations in a piano roll and a connection between the piano and a slide projector which synchronizes the consecutive projection of a series of slides, each having a segment of a song associated with the melody on the piano roll as the piano roll is played.

Player pianos are enjoying a renewed popularity with many of the older pianos being rebuilt and some newer models being commercially introduced to the public. Such pianos normally have a player mechanism for automatically playing the keys of the instrument in response to a pneumatic sensing device which scans a paper, perforated musical record, commonly referred to as a piano roll. Normally the piano roll is unwound from one of a pair of support rolls and wound on the second roll as the instrument is being played, and then the rotation of the rolls reversed to rewind the piano roll at the conclusion of the melody. The pneumatic means which senses the perforation in the piano roll includes an elongated tracker bar in contact with the roll having a series of air ports which are opened and closed by the piano roll as it is moved between its support rolls. Each of the air ports is connected by a pressure-responsive device arranged to play one of the keys on the piano as the port is opened by a perforation in the roll.

The broad purpose of the present invention is to provide an attachment for either the older or the newer model player pianos and organs which project the words of a song on a viewing apparatus from a series of slides in synchronization with the playing of the piano roll so that the song can be sung in accompaniment with music being played by the instrument.

Summary

The preferred embodiment of the present invention comprises a conventional player piano coupled with a slide projector having a projection lens and a slide tray driven by a slide-changing mechanism which when electrically actuated moves a slide into a projection position.

Normally a set of slides having the words of a song which are associated with the melody on a particular piano roll are disposed in the slide tray. The tray is indexed at suitable intervals as the piano roll is being played so that the words projected on the suitable screen correspond to the portion of the melody being played on the piano roll.

In the preferred embodiment, the connection between the player piano and the slide projector comprises a pneumatic-electric switch which is pneumatically connected with the tracker bar and electrically connected to the slide changing mechanism of the slide projector. The piano roll, in addition to its conventional set of music perforations which are arranged in accordance with the notes of a melody, is modified to include a set of control perforations spaced along one of its longitudinal edges. The control perforations extend in the direction of motion of the piano roll as it is moved during the playing of the melody. Each control perforation is adapted to trigger a slide-change operation.

The control perforations are formed in a series on the roll so that they pass over an air port in the tracker bar which is not normally connected with one of the keys of the instrument. This control port is connected by a tubular member to a vacuum switch having a flexible diaphragm. The diaphragm has a bleed hole so that both sides are connected to a source of vacuum and one side connected with the control port. As the control port is opened and closed by the control perforations in the piano roll, a variable pressure differential is created across the diaphragm which causes it to flex each time the control port is opened by a control perforation.

The diaphragm is connected to an electrical control switch which opens and closes an electrical actuating circuit connected to the slide-changing mechanism of the projector. Thus each time the control port is opened by a control perforation, a slide change operation is triggered so that the slide projector operates in synchronization with the playing of the piano roll.

Other connections may be made between the piano roll and the slide projector in order to produce synchronized operation. For instance, the pneumatic sensing means of the vacuum switch could be replaced by means for sensing magnetic particles carried on a tape which moves with the piano roll. Similarly other forms of pneumatic switch devices may be employed to convert a signal from the player mechanism to a suitable impulse which will actuate the change mechanism of the slide projector.

Still other advantages of the present invention will readily occur to those skilled in the art to which the invention pertains upon reference to the following detailed decription.

Description of the drawings

The description refers to the accompanying drawings in which like reference characters refer to like parts throughout the several views and in which:

FIGURE 1 is a view showing a player piano coupled with a slide projector in accordance with the invention; and FIGURE 2 is a diagrammatic view of the pneumatic-electrical connection between the player piano and the slide projector.

Description of the preferred embodiment

Now referring to the drawings, the preferred embodiment of the invention comprises a player piano generally indicated at 10 connected with a slide projector generally indicated at 12 in such a manner that as the piano 10 automatically plays a melody corresponding to the perforation in a selected piano roll 14, the projector 12 successively indexes a series of slides supported in a rotatable tray 16 into a projection position so that they project the words of a song onto a screen 18 which accompany the particular melody being played.

The player piano 10 is of substantially conventional construction and has a player mechanism 20 with a tracker bar 22 which senses the perforations in the piano roll as it is fed downwardly from an upper support roll 24 to a take-up roll 26. The tracker bar has a series of air ports 28 disposed in the path of the perforations in the piano roll 14 which are connected by a pneumatically-actuated means to the keys of the piano. Thus there is normally one air port 28 for each key with the perforations in the piano roll arranged to energize the keys in accordance with the notes of a particular melody. The construction of the piano 10 and the piano roll 14 as heretofor described and conventional and well known to those skilled in the art of automatic instruments such as player pianos and organs and the like so that a more detailed description is not necessary.

The slide projector 12 is relatively conventional and includes a projection lens means 30 for projecting the words on each slide in the tray 16. The projector 12 also has an electrical cord 34 adapted for connection to a conventional source of electrical power, and an on-off switch 36 for energizing the projector. The projector has an internally mounted slide-changing mechanism which is controlled by a control switch 38 which when closed initiates a slide-changing operation.

In order to generate the control signals that will trigger the switch 38 to initiate a slide-changing operation, the piano roll has a series of control perforations 40 along one longitudinal side. The control perforations 40 are spaced in the direction of motion of the piano roll with the distance between successive perforations corresponding to the segment of a melody on the piano roll associated with the words on a slide. Each control perforation 40 is intended to trigger a slide-changing operation.

The control perforations may be provided on conventional piano rolls by punching the control perforations along the longitudinal edge of the roll in a portion that passes over a suitable air port.

The purpose of the perforations is to provide a signal which when received by suitable means will initiate a slide-changing operation. Thus a magnetic tape could be mounted on the support rolls to move with the piano roll and having magnetic particles disposed at suitable intervals in its direction of motion which when sensed by suitable means will cause the switch 38 to trigger a slide-changing operation.

In the preferred embodiment, the control perforations 40 pass over one of the air ports in the tracker bar 22 which will be referred to as a control port 42. A pneumatic tube 44 connects the control port 42 to the control switch means 38. Control means 38 is a substantially conventional pneumatic switching device which includes a housing 48 in which a diaphragm 50 commonly referred to as a pouch is supported in such a manner as to form a pressure chamber 52 in which the diaphragm 50 forms a movable, flexible wall. The opposite side of the diaphragm 50 is connected to a source of vacuum 54 which preferably is the same source of vacuum that operates the pneumatic sensing means of the tracker bar 22. A bleed hole 56 in the diaphragm provides communication between both sides of the diaphragm so that the chamber 52 also is normally in a low pressure vacuum condition.

The control port 42 in the tracker bar and the piano roll act as a valve to open and close communication between the vacuum chamber 52 and the atmosphere. When the control port 42 is closed by the piano roll, the vacuum chamber 52 is in a partial vacuum condition so that the diaphragm 50 assumes a balanced position. When one of the control perforations 40 is passed over the control port 42 by the motion of the piano roll, the vacuum chamber 52 is momentarily opened to the atmosphere so that the pressure increases which changes the pressure differential across the diaphragm causing it to flex.

A piston 58 supported on the lower side of the diaphragm 50 is operatively connected to an electrical switch contact 60. When the diaphragm 50 is flexed by the air port 42 sensing one of the control perforations, contact 60 makes with a companion contact 62 to close an electrical control circuit 64 which sends a control impulse to the slide-change mechanism 64 of the projector. As each of the control perforations 40 passes over the control 42, the vacuum switch means 38 triggers a slide-changing operation so that a new slide disposed in the tray 16 is moved into projection position. The set of slides in the slide tray 16 having the words of the song which correspond to the melody on the piano roll 14 are successively projected on the screen in synchronization with the playing of the piano roll 14.

Another method of preparing the piano roll for use in the preferred embodiment to trigger a slide-change operation is to attach short strips of magnetic tape along the side edge of the roll at suitable intervals. The circuitry to the slide-change mechanism would then include a pair of finger-like, spring biased contacts mounted adjacent the tracker bar in contact with the roll and arranged so that the short strips of magnetic tape engage the pair of contacts, they close the circuit and trigger the slide-change mechanism 64. This arrangement would eliminate the pneumatic portion of the control switch means 38 with the contacts engaging the magnetic strips replacing the contacts 60 and 62 of the control switch means.

When a new selection is to be played, the operator can change the piano roll and the set of slides. A series of melodies can be recorded on a single roll with the slide tray storing a series of sets of slides, each set having the words of a song which are to accompany the corresponding selection on the piano roll. Other forms of slide propectors can be employed which are of the type that advances the slides upon receipt of a signal such as an electrical impulse. Other forms of switching devices can be employed to receive a signal from the piano as the piano roll is played and convert the signal to a suitable impulse which is transmitted to the slide-changing mechanism of the projector.

Although I have described in detail but one embodiment of my invention, it is to be understood that various changes and revisions can be made therein without departing from the spirit of the inveniton.

What is claimed is:

1. In combination with an automatic musical instrument operated by a player mechanism under control of a movable musical record having a set of perforations corresponding to a melody for controlling the musical output of the instrument, the combination comprising: a slide projector having a controllable, slide-changing mechanism for moving slides through a slide projection position in a slide-changing operation and operable, upon actuation, to initiate a slide-changing operation; first means on the player mechanism movable with the musical record as the record is being played by the player mechanism; control switch means under control of the first means and connected with the slide projector for actuating a slide-change in synchronization with the playing of the musical record so that a series of slides having the words of a song may be sequentially automatically projected on a viewing device in accompaniment with the melody being played by the musical instrument.

2. The combination as defined in claim 1, wherein said record comprises a music roll and said player mechanism has a pair of spaced, rotatable support rolls, the music roll being adapted to be unwound from one of the support rolls and wound on the second of a pair of support rolls as the player mechanism is operated, and wherein said first means includes a signal means carried by the music roll at spaced intervals in the direction of its motion between the pair of support rolls, and the control switch means has means supported in a sensing position adjacent the path of the music roll for detecting said signal means moving past the sensing position as the music roll is moved by the player mechanism, and means responsive to the detection of a signal means for actuating the slide-change mechanism of the projector.

3. The combination as defined in claim 1, wherein the musical record comprises a music roll supported for motion between a pair of support rolls and adapted to be wound on one of the support rolls and unwound from the other support roll, said music roll being formed with a series of control perforations spaced in its direction of motion as it is moved between the support rolls and wherein said control switch means includes pneumatic means for sensing the motion of the control perforations past a sensing position as the music roll is moved by the player mechanism, and electrical circuit means connecting the control switch means and the slide-change mechanism for transmitting an electrical impulse in response to the pneumatic means sensing a control perforation in the music roll.

4. The combination as defined in claim 1, wherein the music record comprises a music roll movable between a pair of spaced support rolls and adapted to be wound on one of the support rolls and unwound from the second of the pair of support rolls, and said first means comprises a series of control perforations formed on the music roll at predetermined intervals in the direction of motion of the music roll as it is moved by the player mechanism, each of said control perforations being associated with a slide-changing operation, and wherein said control switch means is connected to a source of vacuum, and includes a chamber having a movable pressure-responsive wall, means providing a connection between the source of vacuum and the chamber to balance the wall in a first position, passage means connecting an air port in contact with said music roll in the path of the control perforations so that the music roll opens and closes the chamber to the atmosphere as the control perforations pass over the air port, the passing of a control perforation over said port opening the chamber to the atmosphere so that a pressure variation in the chamber moves the wall from its balanced position; and including electrical circuit means with electrical switch means responsive to motion of the movable wall to actuate the slide-change mechanism.

5. The combination as defined in claim 3, wherein the player mechanism has a tracker bar with a series of air ports and a music roll supported for motion over said tracker bar to open and close said series of air ports and said chamber is pneumatically connected with one of the air ports in said tracker bar.

6. The combination as defined in claim 3, wherein said pressure-responsive wall comprises a diaphragm having a vacuum bleed hole providing controlled communications between opposite sides of the diaphragm and said vacuum source is connected to both sides of the diaphragm to pressure balance it and one side of the diaphragm is connected to the air port so that as a control perforation in the music roll opens and closes communication between the diaphragm and the atmosphere, a pressure imbalance is developed across the diaphragm which moves it from its balanced position.

7. In combination, a player piano having a player mechanism, a piano roll supported in the player piano for motion with a first set of perforations associated with the notes of a melody extending in its direction of motion for controlling the operation of the player mechanism, a second set of control perforations formed in its direction of motion and spaced at predetermined intervals associated with segments of the melody; a tracker bar supported in contact with the piano roll with air ports disposed in the path of said first and second sets of perforations, including a control port disposed in the path of the control perforations, said control port being opened at such times as the piano roll passes the control perforations over the control port and being closed at other times during motion of the piano roll; a source of vacuum; vacuum switch means including a flexible diaphragm having one side connected to said control port and its other side connected to the source of vacuum and a bleed hole in the diaphragm adapted so that the diaphragm flexes as the control port is opened and closed by a control perforation; a slide projector having a slide-changing mechanism; and electrical circuit means connected with the slide-changing mechanism including electrical switch means, coupled with the diaphragm so that motion of the diaphragm transmits an electrical actuating impulse to the slide-changing mechanism so that a series of slides each having a segment of a song corresponding to the segments of the melody between the control perforations on the piano roll, may be projected by the slide projector in synchronization with the playing of the piano roll.

References Cited

UNITED STATES PATENTS

| 3,141,056 | 7/1964 | Kisker | 84—160 X |
| 3,215,036 | 11/1965 | Kirkconnell et al. | 353—103 X |
| 3,282,155 | 11/1966 | Cleary et al. | 353—103 X |

RICHARD B. WILKINSON, Primary Examiner

JOHN F. GONZALES, Assistant Examiner

U.S. Cl. X.R.

84—464